Oct. 11, 1938.    S. E. PAINE    2,133,058
WELDING
Filed Feb. 4, 1936
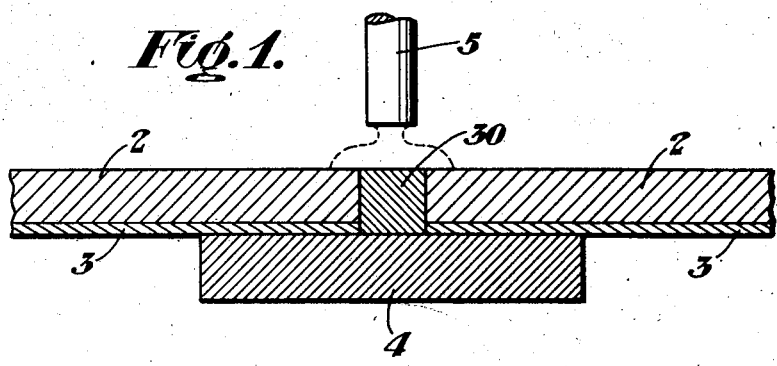
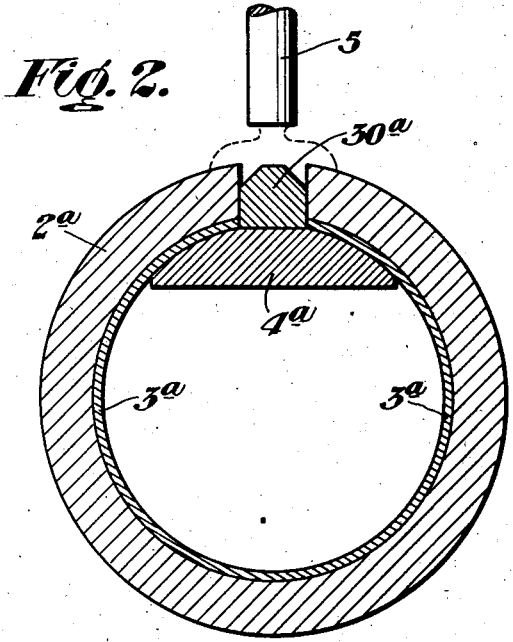
Inventor:
SUMNER E. PAINE,
by: Usina &Rauber
his Attorneys.

Patented Oct. 11, 1938

2,133,058

UNITED STATES PATENT OFFICE 2,133,058

WELDING

Sumner E. Paine, McKeesport, Pa., assignor to National Tube Company, a corporation of New Jersey Application February 4, 1936, Serial No. 62,359

1 Claim. (Cl. 219—10)

This invention relates to welding, and more particularly to the electric welding of plychrome plates.

A plychrome plate consists of a sheet of basic steel which is covered on one side with a thinner sheet of stainless steel. These plates have a variety of uses, such as for stainless steel lined tanks, but are difficult to weld without impairing the qualities of the thinner sheet of stainless steel by pollution with the basic steel. It has been the practice when welding plychrome plates which are accessible on both sides to weld from the basic steel side with a basic steel welding-rod. A groove is then chipped from the stainless steel side of the plychrome plate and this groove is filled by welding with a stainless steel welding-rod. The reason for this chipping operation is to remove the penetrated part of the basic steel weld, which would otherwise pollute that area of the stainless steel side of the plate. Molten basic steel in contact with stainless steel has such great affinity for the latter that the two steels mix, whereby the stainless steel has its qualities greatly impaired by this pollution.

However, this method of welding cannot always be employed. On small diameter plychrome pipe, with the stainless steel coating on the inside, this method of welding is impossible of performance, due to the inaccessibility of the inside of the seam; on light gage plychrome it is not practical to chip a groove for the purpose of depositing a stainless steel bead.

It is among the objects of the present invention to weld material of the class described without the difficulties previously referred to, and on objects heretofore impossible to operate on.

The foregoing and other objects will be apparent after referring to the drawing, in which:

Figure 1 is a diagram showing the manner in which the method of my invention is performed.

Figure 2 is a view similar to Figure 1 but disclosing a modification.

Referring more particularly to the drawing, the numerals 2 designate a pair of basic steel sheets each of which has a coating 3 of stainless steel on one of its sides. In lieu of beveling these plates in accordance with prior methods, I leave the ends thereof in their original right-angular relationship and dispose therebetween a square wire 30 of stainless steel. The seam between the plychrome plates, and in which the square wire 30 is disposed, is backed-up on the stainless steel side with a copper bar 4 which is held in close contact therewith. The seam is then welded from the basic steel side of the plychrome plates while using a stainless steel or ordinary steel welding-rod 5.

In Figure 2 of the drawing the method of the invention as applied to welding a bi-metallic tube is shown. The numeral 2ª designates a basic steel strip formed into a tube which has a coating or layer 3ª of stainless steel on its inner side. In lieu of beveling this plate 2ª in accordance with prior practice, I leave the edges thereof in their original right angular relationship and dispose therebetween a square wire 30ª of stainless steel of a composition substantially the same as or similar to the layer 3ª. The seam in the plychrome tube, in which the square wire 30ª is disposed, is backed up on the stainless steel side with a copper bar 4 which is shaped to conform to the inner surface of the tube and the wire 30ª so that it can be held in close contact with the inner surface of the wire 30ª and the adjacent surfaces of the stainless layer 3ª. The seam is then welded from the basic steel side of the plychrome tube while using a stainless steel or ordinary steel welding rod 5.

Stainless steel being a poor conductor of heat, the heat from the welding arc does not penetrate the stainless steel wire 30 or 30ª coating 3 or 3ª to the surface of the copper bar 4 to such an extent that the stainless rod 30 or 30ª and the coating 3 or 3ª will become molten throughout its thickness. This is for the reason that the copper bar effectively absorbs heat from the stainless steel in contact with the bar. Thus, an unfused and unpolluted surface of stainless steel is presented to the stainless steel side of the plychrome plate, and chipping and welding the inside of the seam is unnecessary.

Another advantage of this method of welding is that it is not necessary to bevel or prepare the edges of the seam, which is of great assistance in cutting and bending plychrome into shape, and particularly pipes and tubes.

It will be readily understood by those skilled in the art that the wire 30 need not necessarily be square, but should be of such shape as to form good contact with the stainless steel coating 3 of the plychrome and with the surface of the copper bar.

While I have shown and described one specific embodiment of my invention, it will be understood that I do not wish to be limited exactly thereto, since various modifications may be made without departing from the scope of my invention, as defined by the following claim.

I claim:

The method of joining bi-metallic articles composed of contacting layers of stainless steel and basic steel which includes juxtaposing the edges of the said bi-metallic articles to be joined, the like layers of said bi-metallic articles being oppositely disposed, disposing a metallic filler between and in contact with the juxtaposed edges of said bi-metallic articles, said filler being of substantially the same composition as the metal of the said stainless steel layer and having a surface which is substantially flush with the outer surface of the layer of stainless steel, placing a backing-up bar of high heat conductivity against the substantially flush surface of said filler and the adjacent stainless steel surfaces, and welding said metallic filler to the juxtaposed edges of said bi-metallic articles from the said basic steel side without fusing the surface of the said filler which is flush with the adjacent stainless steel surfaces.

SUMNER E. PAINE.